(12) United States Patent
Westergaard Andersen

(10) Patent No.: US 9,676,556 B2
(45) Date of Patent: Jun. 13, 2017

(54) PIVOT LINK

(71) Applicant: AMMERAAL BELTECH MODULAR A/S, Vejle (DK)

(72) Inventor: Kenneth Westergaard Andersen, Vejle Øst (DK)

(73) Assignee: AMMERAAL BELTECH MODULAR A/S, Vejle (DK)

( * ) Notice: Subject to any disclaimer, the term of this patent is extended or adjusted under 35 U.S.C. 154(b) by 36 days.

(21) Appl. No.: 14/760,919

(22) PCT Filed: Jan. 13, 2014

(86) PCT No.: PCT/DK2014/050006
§ 371 (c)(1),
(2) Date: Jul. 14, 2015

(87) PCT Pub. No.: WO2014/111091
PCT Pub. Date: Jul. 24, 2014

(65) Prior Publication Data
US 2015/0344228 A1 Dec. 3, 2015

(30) Foreign Application Priority Data
Jan. 15, 2013 (DK) .................. 2013 70021

(51) Int. Cl.
B65G 17/08 (2006.01)
B65G 17/06 (2006.01)
B65G 17/18 (2006.01)
B65G 17/46 (2006.01)

(52) U.S. Cl.
CPC ............. B65G 17/08 (2013.01); B65G 17/18 (2013.01); B65G 17/46 (2013.01)

(58) Field of Classification Search
None
See application file for complete search history.

(56) References Cited

U.S. PATENT DOCUMENTS 7,134,545 B1 * 11/2006 Smith ................... B65G 17/08
198/834

FOREIGN PATENT DOCUMENTS

| WO | 9948779 A1 | 9/1999 |
| WO | 2009026536 A1 | 2/2009 |
| WO | 2011087937 A1 | 7/2011 |

* cited by examiner

Primary Examiner — Kavel Singh
(74) Attorney, Agent, or Firm — William H. Honaker; Dickinson Wright PLLC

(57) ABSTRACT

Modular belt module of the type having a width, and a length, where the width and length defines a plane, and a thickness orthogonal to said plane, such that the basic module is limited by two longitudinal sides, and a front and rear side, where the module comprises an upper part and a lower part, both upper and lower part being pivotally connectable in use to a forwardly arranged belt module, whereas only the bottom part is connected in use to a rearwardly arranged belt module, and where said upper part when in contact with said lower part is provided with means projecting below said lower part.

9 Claims, 5 Drawing Sheets

PIVOT LINK

CROSS REFERENCE TO RELATED APPLICATION

This application claims the benefit of PCT International Application Serial No. PCT/DK2014/050006 filed on Jan. 13, 2014, which claims priority to PA 2013 70021 filed on Jan. 15, 2013, the entire disclosures of which are incorporated herein by reference.

FIELD OF THE INVENTION

The present invention relates to a modular belt module, a conveyor structure including a conveyor belt made from the inventive modular belt module as well as a conveyor belt including such a modular belt module. The belt module is particular in that it is able to be activated such that at least a part of the module's surface may be angled relative to the conveyor belt surface such that a flight, also known as a product support, is created. These flights are typically used on inclined conveyor structures in order to be able to transport a product up the incline.

BACKGROUND OF THE INVENTION

A problem with these flights is the fact that the product may stick to the surface of the flight such that as the conveyor belt on the return trip has the flights pointing downwards, any products which were stuck onto the flight may drop off, for example on the floor below the conveyor, and thereby become contaminated and must be destroyed. This is particularly true in the food industry and the amount of product, for example when poultry, shrimp, shellfish or fish is transported on these types of inclined conveyors may be up to 15-20% which is a substantial economic loss. A further problem with the prior art flights is the fact that where product is transferred from a regular conveyor onto a conveyor including flights there is an interface zone, i.e. a distance between the conventional conveyor and the conveyor including the flights such that the flights may pass this first conveyor. As a flight passes the plane of the first conveyor an opening arises such that product may fall between the two conveyors down onto the floor or the following flight.

A similar situation is present at the top of the conveyor, where the conveyed product is delivered to the next process step, for example another conveyor. It is here necessary to arrange the conveyor below the inclined conveyor at a distance allowing the flights to pass the following conveyor. For some products the drop from the inclining conveyor to the following conveyor may damage the product or create turbulence which is not desirable in a transport line, and therefore the conveyor may work at reduced speed or be unsuitable for these types of products altogether.

From DE8915286U is a conveyor known which is provided with pivotal members, which pivotal members can be activated by rails arranged under the conveyor belts surface, such that the pivotal members are can be raised from the surface of the conveyor in order to operate as flights when it is desirable to transport objects (in the actual case vegetables, fruit and the like) up inclines. Although a scraper may be activated in order to scrape debris etc. from the upper surface of the conveyor belt, no means are disclosed for cleaning all the surfaces of the conveyor belt.

OBJECT OF THE INVENTION

Consequently it is an object of the present invention to provide a conveyor which addresses these problems and provides additional advantages.

DESCRIPTION OF THE INVENTION

The invention addresses this by providing a modular belt module of the type having a width, and a length, where the width and length defines a plane, and a thickness orthogonal to said plane, such that the basic module is limited by two longitudinal sides, and a front and rear side, where the module comprises an upper part and a lower part, both upper and lower part being pivotably connectable in use to a forwardly arranged belt module, whereas only the bottom part is connected in use to a rearwardly arranged belt module, and where said upper part when in contact with said lower part is provided with means projecting below said lower part and where the module is provided with spaced eye parts along the two longitudinal sides, such that eye parts along a front side may be meshed between eye parts along a rear side, and wherein the lower part is constituted by two or more laterally arranged connecting bridges.

When this modular belt module is incorporated into a conveyor structure as disclosed. in a further embodiment of the invention where said conveyor structure comprises a substructure defining the path of an endless conveyor belt, where sprocket wheels are arranged at either end of said path, where at least one sprocket wheel is provided with propulsion means for propelling said conveyor belt along the path, thereby defining a forward upper run and a return lower run, and where the conveyor belt is made up of at least two types of modular belt modules:

a first type of modular belt modules having a width and length, where the width and length defines a plane, and a thickness orthogonal to said plane, such that the basic module is limited by two longitudinal sides, and a front and rear side, where the module comprises an upper part and a lower part, both upper and lower part being pivotally connectable in use to a forwardly arranged belt module, whereas only the bottom part is connected in use to a rearwardly arranged belt module, and where said upper part when in contact with said lower part is provided with means projecting below said lower part, and a second type of modular belt modules, comprising means for connecting to adjacent belt modules along opposing sides, where the means are also suitable to connect to the first type of module, where said conveyor structure further comprises one or more activating rails, arranged under the conveyor belt's path, in positions where it is desirable to engage the means projecting below said lower part of the first type of module, thereby pivoting the upper part of the first module out of the conveyor belt's surface plane a number of advantages are achieved.

By being able to activate and thereby determine when the flights shall be raised it is possible to incorporate these modular belt modules into a conveyor structure without the problems as mentioned above with respect to the interfaced two neighbouring adjacent conveyors. If the flights are not raised when the conveyor belt turns around the sprocket wheels it is possible to utilize traditional means of transferring a product from one conveyor belt to the conveyor belt incorporating the inventive modules with raisable flights. In a similar manner, before delivering the product for further processing at the end of the conveyor incorporating the modular belt modules the flights may be lowered such that the adjacent conveyor belt may be positioned immediately adjacent the conveyor.

Within this application and in particular with respect to the claims the terms "forwardly" and "rearwardly" shall be understood in the following manner. When the modular belt modules are assembled to a conveyor belt and arranged on a suitable sub-structure comprising conveyor belt drive means the conveyor belt will be activated to convey products in one direction. This direction is called the upstream direction. For a particular belt module, this module will be connected to adjacent belt modules along two opposing module sides. Towards the upstream direction is the forwardly arranged belt module and in the opposite direction, downstream direction is the rearwardly arranged belt module.

For a number of products it is desirable to provide a scraper at the end of the conveyor in order to clean and product or debris off the conveyor belt. Having flights arranged permanently substantially orthogonal to the surface of the conveyor belt, makes the use of a scraper very difficult, complicated and often impossible.

By further having the lower part of the module very open due to the connecting bridges, a light weight construction is achieved. Furthermore the open construction makes it especially suitable for applications where high requirements to hygiene and cleaning are a must. The connecting bridges are typically positioned and dimensioned such that the connecting bridges transfer the loads and tension forces in the belt during use, but at the same time leaves a substantial area open between the two longitudinal sides, and the front and rear sides. This open area is not used anyway as the upper part of the module when in a non-raised position will cover the area, and in the upper parts' raised position, any objects/goods placed here will be moved with the upper part as the part is pivoted. Consequently a more open and easy to clean construction is provided.

In order to raise and lower the flights, i.e. the upper part of the modular belt module, activating rails are arranged on the conveyor structure in those zones where it is desirable to raise the flights. The activating rails engage the means projecting below the lower part of the inventive modular belt module such that by engagement with the rails the upper part of the module is forced upwards. Depending on the size of the means projecting below the lower part of the module the flight may be raised more or less, however, typically the means are designed such that the upper part of the module will be raised to an angle corresponding to approx. 90 degrees with respect to the transporting surface of the entire conveyor belt.

The modules according to the present invention may also be manufactured as so-called side-flexing modules where adjacent modules are able to flex or turn relative to adjacent modules about a vertical axis or axis perpendicular to the plane of the module. In this manner it becomes possible for the conveyor to travel through curves.

Additional advantages will be obtained by the further embodiments as set out in further dependent claims, and as explained below.

DESCRIPTION OF THE DRAWING

The invention will now be explained with reference to the accompanying drawings wherein.

DETAILED DESCRIPTION OF THE INVENTION

Figure 1:
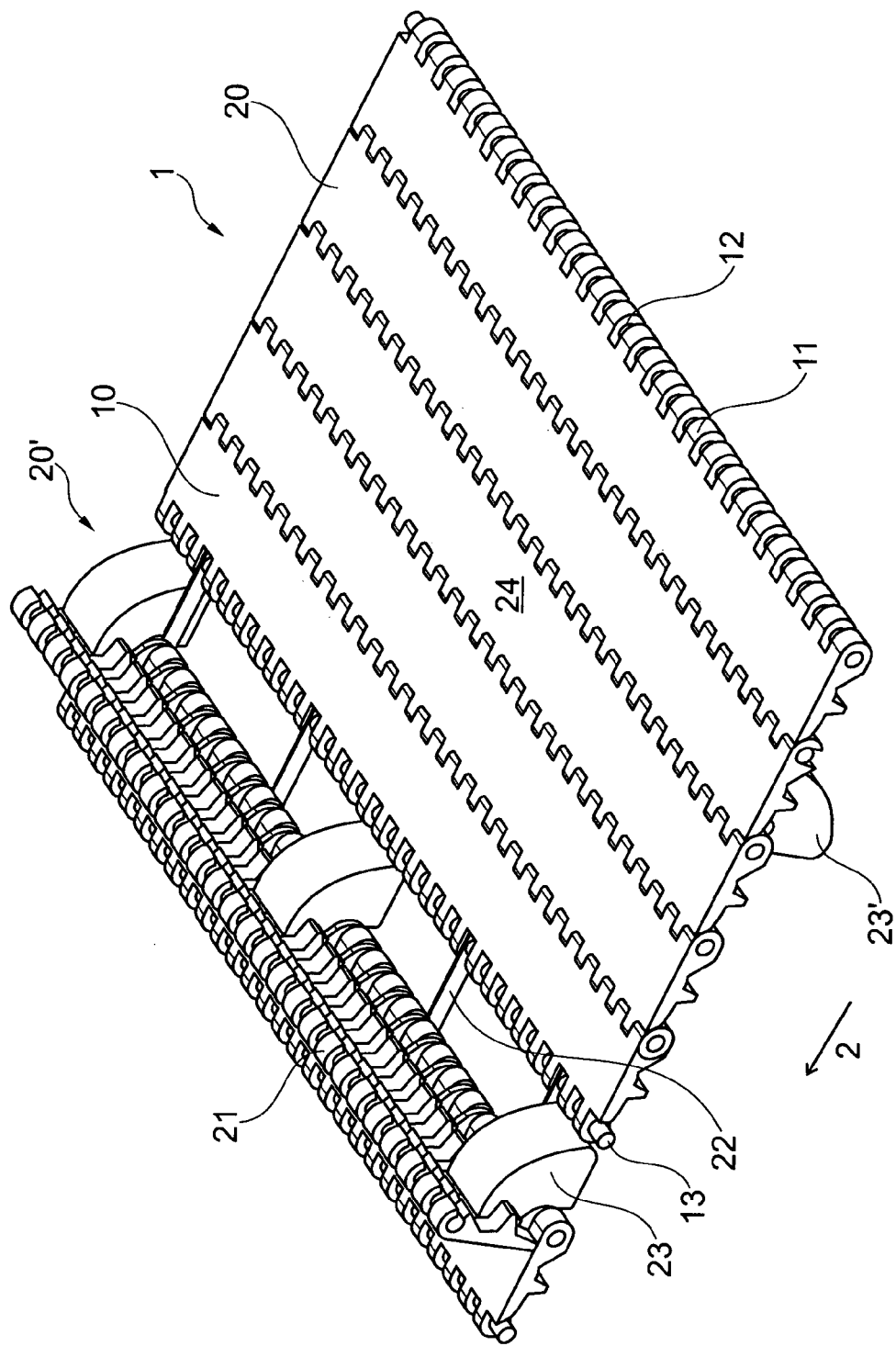
FIG. 1 illustrates a section of a conveyor belt made of modular belt modules.

In FIG. 1 is illustrated a section of a conveyor belt 1 made of modular belt modules where a first type of modular belt modules 10 are of a standard well-known type. The modular belt modules 10 are provided with eye-parts 11 spaced by apertures 12. The eye-parts 11 are provided with lateral apertures such that by arranging the eye-parts 11 of an adjacent belt module in the apertures 12, the apertures of the eye-parts will overlap, and it is possible to connect adjacent modular belt links by inserting a connection pin 13 through the overlapping apertures in the eye-parts and in this manner create a pivotable connection between adjacent belt modules.

At certain intervals in the conveyor belt 1 special belt modules according to the invention are arranged. This second type of module 20 has an upper part 21 and a lower part 22. The upper 21 and lower 22 parts of the belt modules 20 are pivotally connected such that the upper part 21 of the belt module 20 may be arranged in the same surface plane as the regular modules 10 and in this manner constitute a substantially flat and flush conveyor belt surface. Due to the pivot arrangement of the upper part relative to the lower part the upper part may also be brought into a position where the surface of the upper part is elevated to any angle relative to the surface of the conveyor belt, but most preferred at an angle of approximately 90° as illustrated with the module 20'.

The inventive module 20 according to the invention has as already explained above an upper part 21 and a lower part 22. The size of the lower part 22 is such that the modular sectioning of the conveyor belt is the same as the regular modular belt modules 10 and therefore the inclusion of the two part belt modules in a regular conveyor belt does not give rise to any modification etc. In the embodiment of the invention illustrated in the figures the lower module part 22 is in the shape of connectors which will be further explained with reference to FIG. 5. The upper part 21 of the module 20 is provided with means 23 in the shape of notches where the notches 23 project below the lower part when the upper part is in contact with the lower part as illustrated with the module 20. In the conveyor structure (not illustrated) is provided rails which engage the notches 23 urging the notches upwards. As the upper part 21 of the module 20 is hingely connected to adjacent modular belt modules the engagement of the notches will cause the upper part 21 to pivot as illustrated in the left side of FIG. 1. Due to the configuration of the notches 23 as illustrated in the embodiment in FIG. 1 the upper part 21 of the modular belt module 20 will now act as a product support or a flight as the conveyor structure belt 1 travels in the direction indicated by the arrow 2.

It is clear that in positions where no activating rails are arranged in the conveyor structure the upper part will due to the force of gravity collapse into the configuration shown in the right side of FIG. 1, i.e. where the upper part 21 is flush with the conveyor surface 24.

Figure 2:
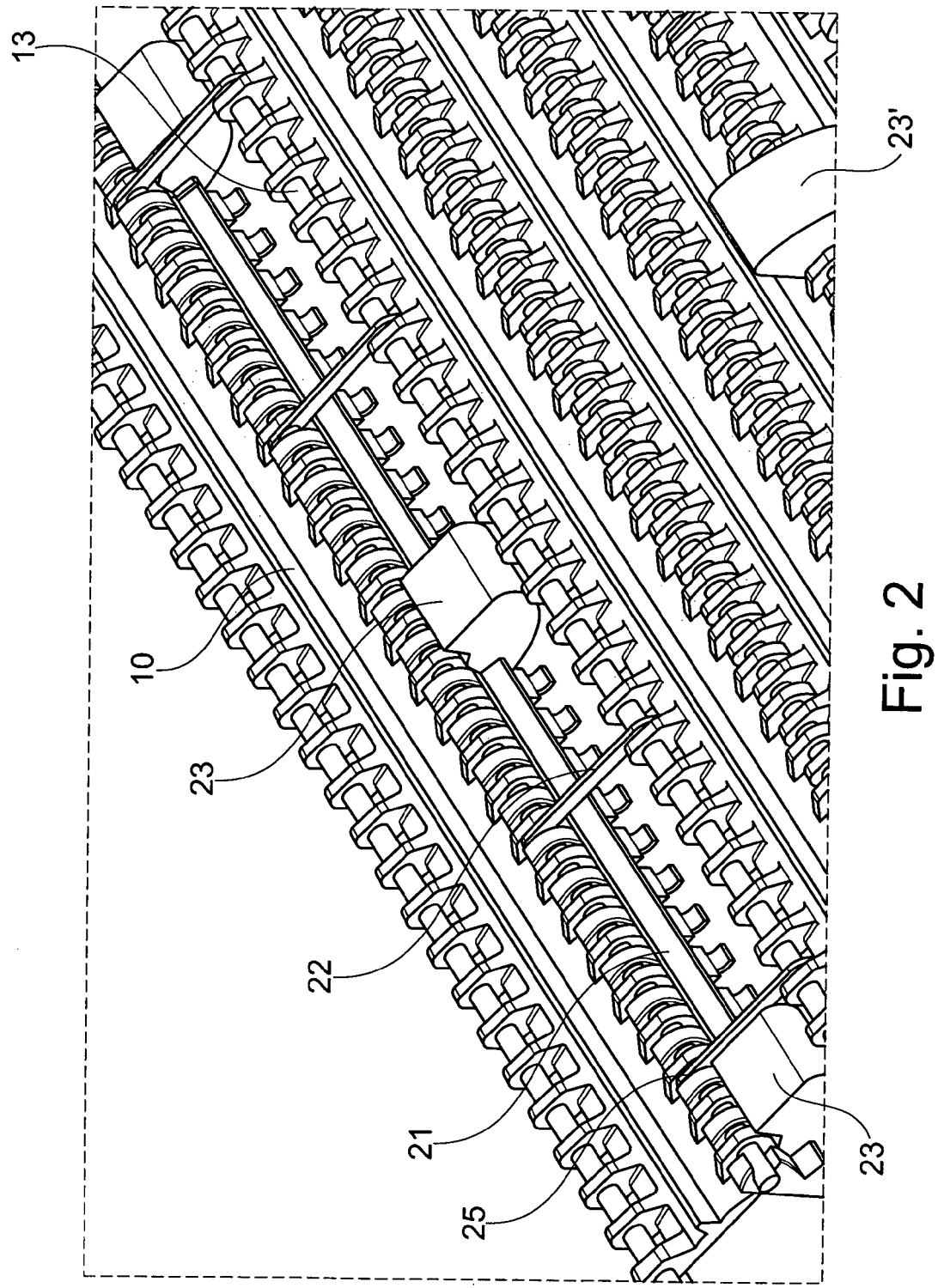
FIG. 2 illustrates a rear view of the section of conveyor belt illustrated in FIG. 1.

In FIG. 2 is illustrated a rear view of the section of conveyor belt 1 illustrated in FIG. 1. Same features are denoted by same reference numbers. As is particularly obvious from the rear side of the modular belt modules is the fact that the connection members 22 share the space between two eye parts with the hinge part 25 of the upper modular member.

Although the lower part of the module 20 in the depicted embodiment is in the shape of connection bridges 22 it will be clear that also plate shape members may be used.

One advantage of using the connection bridges 22 is the possibility to clean the conveyor belt, for example during the return run when it is mounted in a conveyor structure. Especially for applications in the food industry it is very important to retain a very high hygienic standard and by being able to access both the underside and the top side of the pivoting modular belt module a thorough cleaning may be attained.

Figure 3:
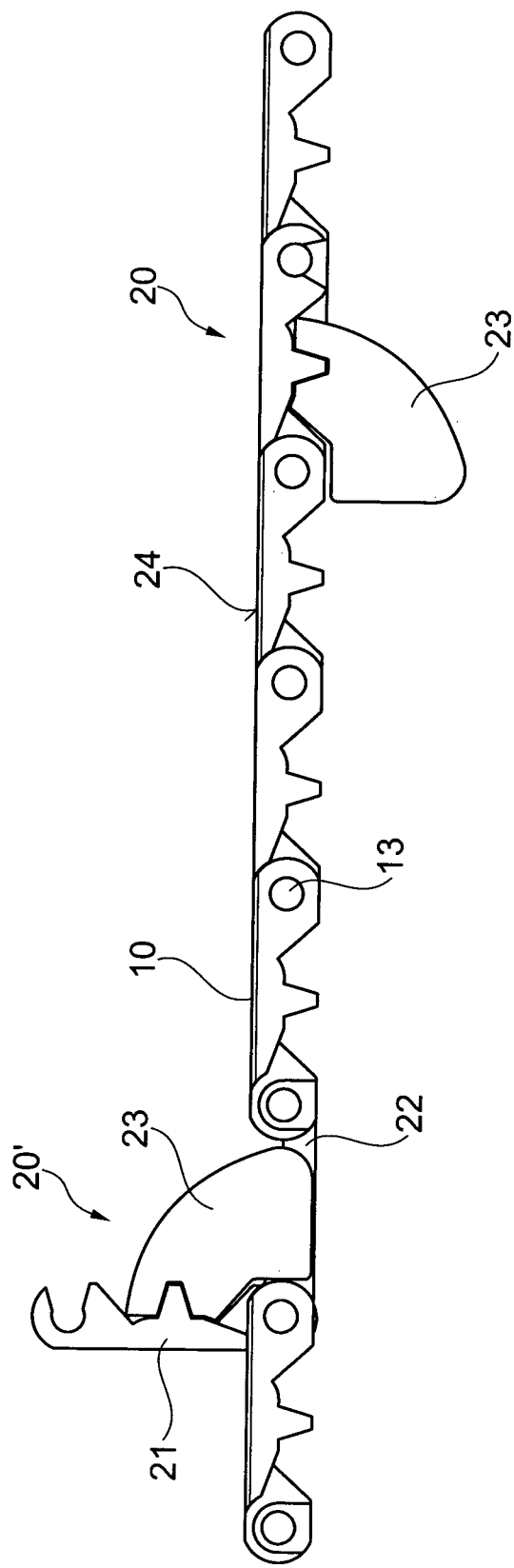
FIG. 3 illustrates a side view of a conveyor belt incorporating two modular belt modules according to the present invention.

In FIG. 3 is illustrated a side view of a conveyor belt incorporating two modular belt modules according to the present invention. The right hand module 20 is in a position where the upper surface of the upper part 21 is substantially flush with the transport surface 24 of the conveyor belt. In this position the notch 23 is not activated by an activating rail arranged underneath the conveyor belt as a part of the conveying structure. The modular belt module 20' illustrated in the left hand part of the figure is, however, activated by an activating rail which is substantially flush with the underside of the conveyor belt thereby forcing the upper part 21 of the modular belt module to pivot into the depicted position where the upper part 21 has the function of a product support or flight.

In FIG. 3 it is clear that the notch 23 extends below the lower part of the module 22 and may due to the hinge arrangement created by the pin 13 pivot into a position where the notch is substantially flush with the underside of the modular belt module and the conveyor belt structure as such.

Figure 4:
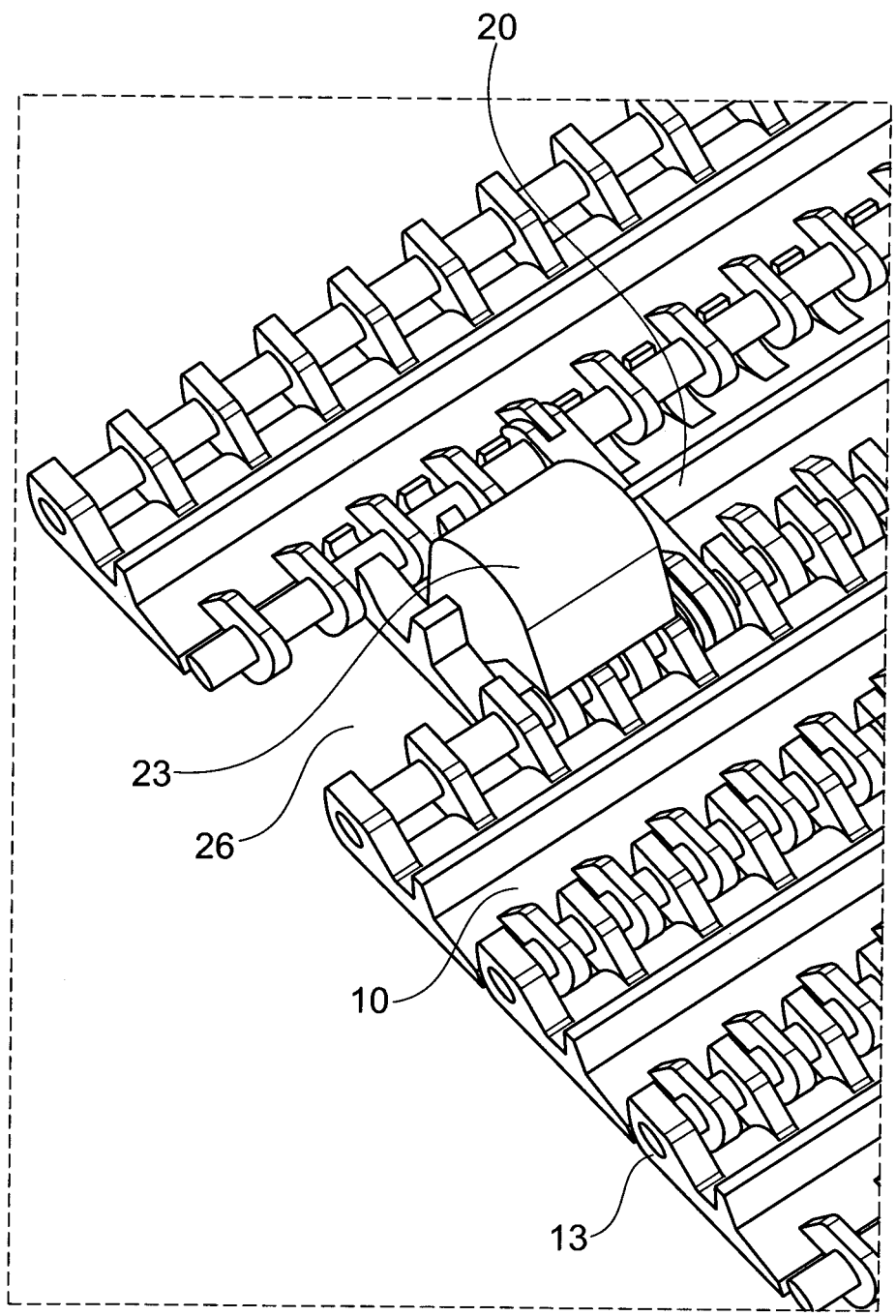
FIG. 4 illustrates view comparable to FIG. 2

In FIG. 4 is illustrated a view comparable to FIG. 2, but in this embodiment the modular belt module according to the invention has a width which is smaller than the regular belt modules 10 leaving an open space 26. This space 26 is created in order to allow the conveyor belt to have an upper guide member (not illustrated) such that the conveyor belt may be maintained in a firm position in the conveyor structure by an upper and lower guide member and still allow the inventive modular belt module 20 according to the present invention to pivot regardless of the limitations of the upper guide rail. Therefore the space 26 shall correspond to the width of an upper guide rail in order to allow the modular belt module 20 to pivot as explained above.

Figure 5:
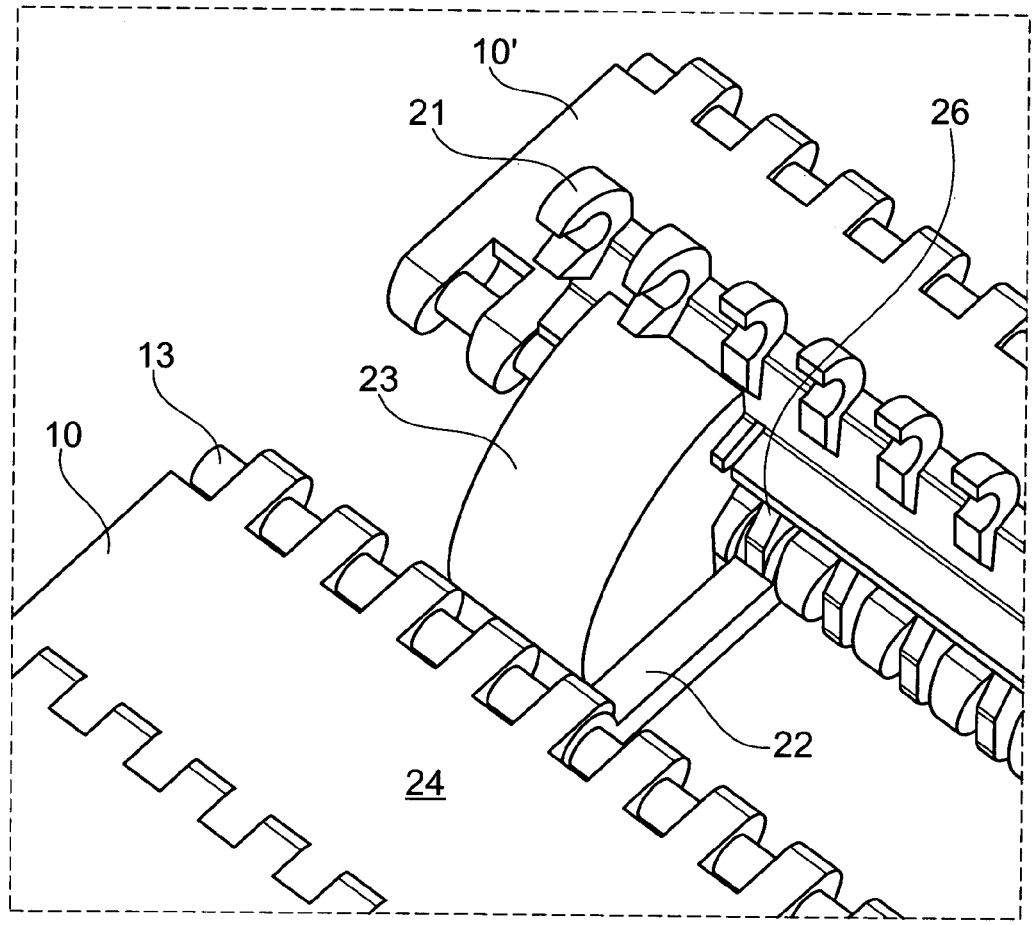
FIG. 5 illustrates a close-up of a conveyor belt where the upper part is activated

In FIG. 5 is illustrated a close-up of a conveyor belt where the upper part 21 is activated, i.e. the notch 23 is in engagement with a guide rail thereby tilting the upper part relative to the conveyor belt's surface 24. As indicated by reference number 26 it is evident that the connection bridge 22 shares a space between two adjacent eye-parts of an adjacent belt link 10' and as such the modular belt module according to the present invention is fully integrated in a normal conveyor belt structure without special adaptations. This is important in that it will be possible to create a conveyor structure using regular/normal sprocket wheels and where only one sprocket wheel is driven such that problems with synchronisation of for example more driven sprocket members is avoided.

Although a single embodiment of the invention has been explained above with reference to a construction of a modular belt module according to the invention, it is clear that the invention is directed to a two part modular belt module which is fully integrable in a conventional conveyor belt structure made up of modular belt modules and by simply arranging activating rails in the conveyor structure, the modular belt module according to the invention may be activated such that the upper part of the belt module will function as a product support/flight. These types of conveyor belts are usable in many aspects of industry and also for horizontal conveyors it may be advantageous to be able to control when the product support is activated such that for example cardboard boxes or other larger items may be slid onto the conveyor belt and after the conveyor belt's loading station the product support may be activated in order to push the cardboard box or large item along the conveyor belt path.

The invention claimed is:

1. Modular belt module having a width, and a length, where the width and length defines a plane, and a thickness orthogonal to said plane, such that the module is limited by two longitudinal sides, and a front and rear side, where the module comprises an upper part and a lower part, both upper and lower part being pivotably connectable in use to a forwardly arranged belt module, whereas only the lower part is connected in use to a rearwardly arranged belt module, and where said upper part when in contact with said lower part is provided with notches projecting below said lower part and where the module is provided with spaced eye parts along the front and rear sides, such that eye parts along a front side may be meshed between eye parts along a rear side, and wherein the lower part is comprised of two or more laterally arranged connecting bridges each disposed between adjacent eye parts along the rear side and extending in use to the rearwardly arranged belt module.

2. Modular belt module according to claim 1 where each bridge has a width generally corresponding to a space between two eye parts.

3. Modular belt module according to claim 1 where a length of the upper part in the intended traveling direction is larger than a length of the lower part.

4. Modular belt module according to claim 1 where the notches arranged on the upper part, projecting below the lower part, have an extend allowing the upper part to pivot into a plane substantially vertical relative to the plane of the conveyors surface, when said notches are brought flush with the underside of the lower part.

5. Modular belt module according to claim 1 where the pivotal connections between adjacent modular belt modules allows adjacent modular belt modules to flex/turn about a vertical axis.

6. Conveyor structure comprising a substructure defining the path of an endless conveyor belt, where sprocket wheels are arranged at either end of said path and at least one sprocket wheel is driven for propelling said conveyor belt along the path, thereby defining a forward upper run and a return lower run, and where the conveyor belt is made up of at least two types of modular belt modules:

a first type of modular belt module having a width, and a length, where the width and length defines a plane, and a thickness orthogonal to said plane, such that the first type of module is limited by two longitudinal sides, and a front and rear side, where the first type of module comprises an upper part and a lower part, and a second type of modular belt module including spaced eye parts for connecting to adjacent belt modules along opposing sides, where the spaced eye parts are also suitable to connect to the first type of module, wherein both the upper and lower part of the first type of modular belt module being pivotably connectable in use to a forwardly arranged second type of modular belt module, wherein only the lower part interconnects in use the first type of module and a rearwardly arranged second type of module, the lower part extending from the rear side of the first type of module to the rearwardly arranged second type of belt module, where said upper part when in contact with said lower part is provided with notches projecting below said lower part, where said conveyor structure further comprises one or more activating rails, arranged under the conveyor belts path, in positions where it is desirable to engage the notches projecting below said lower part of the first type of module, thereby pivoting the upper part of the first module out of the conveyor belts surface plane.

7. Conveyor structure according to claim 6, where the path is defined by a first substantially horizontal section, connected to an inclined section, which in turn is connected to a second substantially horizontal section, where said second horizontal section is elevated relative to said first substantially horizontal section.

8. Conveyor belt made up of at least two types of modular belt modules, where both types comprises spaced eye parts for pivotally connecting to adjacent belt modules, where a first type of modular belt module is according to claim 1, and a second modular belt module comprises two opposing lateral sides, each side comprising spaced eye parts to pivotally connect to adjacent modular belt modules of the first or second type, and at least one connection bridge disposed between adjacent eye parts along the rear side of the first type of modular belt module and extending in use from the rear side of the first type of module belt module to one of the opposing lateral sides of the rearwardly arranged second type of belt module.

9. Conveyor belt according to claim 8 where the modular belt modules are arranged in rows, and where in the rows made up of one or more modules of the first type, the width of the row is less than rows made up of other modular belt modules.

* * * * *